(12) United States Patent
Hammer et al.

(10) Patent No.: US 11,840,366 B2
(45) Date of Patent: Dec. 12, 2023

(54) CONTAINER

(71) Applicant: KOCHER-PLASTIK MASCHINENBAU GMBH, Sulzbach-Laufen (DE)

(72) Inventors: Alexander Hammer, Gaildorf (DE); Daniel Bojbic, Sulzbach-Laufen (DE); Oliver Kengeter, Bühlerzell-Geifertshofen (DE)

(73) Assignee: KOCHER-PLASTIK MASCHINENBAU GMBH, Sulzbach-Laufen (DE)

( * ) Notice: Subject to any disclaimer, the term of this patent is extended or adjusted under 35 U.S.C. 154(b) by 463 days.

(21) Appl. No.: 17/274,852

(22) PCT Filed: Sep. 19, 2019

(86) PCT No.: PCT/EP2019/075172
§ 371 (c)(1),
(2) Date: Mar. 10, 2021

(87) PCT Pub. No.: WO2020/074234
PCT Pub. Date: Apr. 16, 2020

(65) Prior Publication Data
US 2022/0041317 A1    Feb. 10, 2022

(30) Foreign Application Priority Data
Oct. 8, 2018 (DE) ..................... 10 2018 007 991.1

(51) Int. Cl.
*B65D 1/09*    (2006.01)
*A61J 1/06*    (2006.01)
(Continued)

(52) U.S. Cl.
CPC .............. *B65D 1/095* (2013.01); *A61J 1/067* (2013.01); *B29C 33/44* (2013.01);
(Continued)

(58) Field of Classification Search
CPC .. B65D 1/095; B65D 1/09; A61J 1/067; A61J 1/06; A61J 1/065; B29C 33/44; B29L 2031/712
(Continued)

(56) References Cited

U.S. PATENT DOCUMENTS 2,814,420 A * 11/1957 Elder, Jr. .............. B65D 1/0238
                                                              222/215
3,460,724 A *  8/1969 Chmela .................. B65D 47/36
                                                               D9/449
(Continued)

FOREIGN PATENT DOCUMENTS

DE    10 2007 009 457    8/2008
DE    10 2017 007 443    2/2019
(Continued)

OTHER PUBLICATIONS

International Search Report (ISR) dated Dec. 12, 2019 in International (PCT) Application No. PCT/EP2019/075172.

*Primary Examiner* — Rafael A Ortiz
(74) *Attorney, Agent, or Firm* — WENDEROTH, LIND & PONACK, L.L.P.

(57) ABSTRACT

A container, in particular in ampoule form, and consists entirely or predominantly of plastic materials and has a container body (10) for receiving a filling product (12). The filling product can be removed via a releasable container opening (22) after a closure part (18) has been removed, which closure part is detachably connected to the neck part (14) of the container body (10) along a separation line (20) in an unopened position. In the unopened position, a conically extending wall (36) on the neck part (14) on the container body (10) and a conically (38) or cylindrically extending wall (38a) on the closure part (18) adjoin the separation line (20). These walls (36, 38, 38a) delimit at least part of an annular space (40, 40a), one end of which (Continued)

opens out into the environment and the other end of which opens out into the separation line (20).

17 Claims, 7 Drawing Sheets

(51) Int. Cl.
  *B29C 33/44* (2006.01)
  *B29C 67/00* (2017.01)
  *B29K 67/00* (2006.01)
  *B29L 31/00* (2006.01)

(52) U.S. Cl.
  CPC .... *B29C 67/0014* (2013.01); *B29C 2791/006* (2013.01); *B29K 2067/003* (2013.01); *B29L 2031/712* (2013.01)

(58) Field of Classification Search
  USPC .............. 206/528, 530, 532; 222/541.4
  See application file for complete search history.

(56) References Cited

U.S. PATENT DOCUMENTS

| | | | | |
|---|---|---|---|---|
| 4,134,511 A | * | 1/1979 | Deussen | B65D 51/20 |
| | | | | 215/48 |
| 4,512,475 A | * | 4/1985 | Federighi | B65D 1/095 |
| | | | | 222/541.9 |
| 5,221,029 A | * | 6/1993 | Stull | B65D 47/36 |
| | | | | 222/541.9 |
| 5,586,672 A | * | 12/1996 | Schneider | B65D 35/12 |
| | | | | 222/541.6 |
| 2002/0100741 A1 | * | 8/2002 | Weiler | B65D 1/0238 |
| | | | | 215/48 |
| 2006/0229583 A1 | | 10/2006 | Nagao et al. | |
| 2011/0031157 A1 | * | 2/2011 | Nakano | A61J 1/067 |
| | | | | 206/532 |
| 2014/0039444 A1 | * | 2/2014 | Togawa | A61J 1/067 |
| | | | | 604/403 |
| 2019/0015297 A1 | * | 1/2019 | Harada | B65D 11/02 |

FOREIGN PATENT DOCUMENTS

| | | |
|---|---|---|
| EP | 1 616 549 | 1/2006 |
| EP | 2 269 558 | 3/2015 |
| JP | 2000-238847 | 9/2000 |

* cited by examiner

CONTAINER

FIELD OF THE INVENTION

The invention relates to a container, in particular in ampoule form and consisting entirely or predominantly of plastic materials, has a container body for receiving a filling product. The filling product can be removed via a releasable container opening after a closure part has been removed in an open position. The closure part is detachably connected to the container body along a separation line in an unopened position.

BACKGROUND OF THE INVENTION

From EP 2 269 558 B1, a generic plastic ampoule is known as a container, having, amongst other things:
- a body section;
- a mouth section, which forms an upper part of the body section;
- a head section, which is continuously formed with the mouth section via a cut-off section; and
- a button section, which is continuously formed with the head section, wherein the plastic ampoule is opened by twisting the button section and cutting off the head section from the mouth section.

The upper part of the mouth section has a diameter, which is reduced more than that of the mouth section to form a shoulder section. The upper end of the shoulder section extends to the lower end of the head section via a cut-off section. The head section is adapted to form a largely semispherical shape, which is slowly curved from the upper part to the lower part.

Further, in the known solution, the part of the head section formed continuously with the cut-off section shall have a wall thickness that is 1.2 to 1.8 times thicker than the wall thickness of the cut-off section.

Under factors of production, these required large differences in wall thickness can very likely result in local leaks in the area of the separation line. For injection products, the local leaks can inevitably result in loss of sterility and critical microbial contamination of the contents of the container.

Also, after opening, a sharp-edged separation surface or fracture surface may occur along the separation line. When the known solution is used for a skin application (cosmetics, topical drugs, etc.), for mucous membrane contact (drinking ampoule with tonic or drug, rectal application), or ear or eye applications, it can then easily cause injuries. It is also difficult to ensure the reliable sealing of a syringe for withdrawing the injection solution from this ampoule because of the not very precisely reproducible surface separation or fracture surface.

The known ampoule is formed of polyethylene (PE) as the plastic material used and is preferably filled with water. However, such ampoules are characterized by the high oxygen permeability typical for the material class, which significantly restricts their use, for instance, for receiving and delivering sensitive vitamin preparations. As a semi-crystalline polymer, PE, as well as polypropylene (PP), is not highly transparent but merely translucent, which renders an inspection of the contents of the ampoule from the outside difficult. In contrast, ampoules having improved barrier properties are known, for instance from EP 1 616 549 B1, which can be achieved by a multilayer structure of the ampoule.

Depending on the position, in particular during the usual horizontal storage of ampoules in cardboard packaging, liquid can enter the hollow section, formed semi-bowl-shaped, of the head part via the transition area along the separation line between the ampoule body and the head section of the head part. Depending on the properties of the liquid, in particular its surface tension, the liquid does not readily flow back into the ampoule body. To be able to return this quantity of fluid, which usually contains an active ingredient, into the interior of the container, it is advisable to vibrate or "tap" the container product at a low frequency before opening the ampoule, and thus, before separating the head section. This is the only way to make sure the dosing is correct. However, such vibration can also result in undesirable foaming in the ampoule, which in turn renders a complete withdrawal of the liquid, and thus, the correct dosing more difficult.

To counter the above-mentioned problems, it has been proposed for a container, in particular for a hermetically sealed ampoule according to DE 10 2007 009 457 A1, to provide the head-sided closure part as the actual closure body with a type of closure ball. The closure ball forms an inner spherical hollow chamber, which opens into the released dispensing opening of the container. These containers are made of a moldable plastic material, such as polyamide (PA), PE or PP. The spherical shape ensures that the plastic material used here can be pulled over a kind of edge in the forming tool to reduce the plastic material to form the separation line, thereby facilitating the opening process for a user. Furthermore, the spherical shape permits an improved return of unintentionally extracted fluid back into the interior of the container body. Also, the spherical hollow chamber ensures that when the head part is separated from the container body at the separation line. The substantially circular dispensing cross-section of the dispensing opening remains open keeping this shape. In this way, sharp transition points at the separation surface or the fracture surface to the container body, which can cause injuries, are also eliminated. The restriction to the above-mentioned materials is on the one hand advantageous, because with these quite soft materials there are rarely any sharp transition points at the separation surface or fracture surface to the container body. The sharp transition points could cause injuries. On the other hand, however, it is disadvantageous, because—as explained above—they are merely translucent, but not transparent, which renders a visual inspection for possible precipitation, turbidity or particulate contamination much more difficult. Amorphous container materials would have to be used for this purpose, such as aromatic polyester materials (PET, PETG, PEF) or amorphous polyolefins such as cycloolefin polymers (COP) or copolymers (COC). However, their mechanical properties, such as brittleness or the modulus of elasticity, prevent the measures mentioned in DE 10 2007 009 457 A1 from being sufficient to enable the ampoule to be opened easily and without sharp edges.

SUMMARY OF THE INVENTION

Based on this prior art, the container or ampoule solution according to the invention addresses the problem of further improving the state of the art, in particular to the effect that the product can be opened easily, that the risk of injury is reduced, that the container or ampoule contents can be removed completely, and that production is simplified, in particular in the context of a blow molding, filling and sealing process while using the above-mentioned amorphous polymers.

A container according to the invention solves this problem. According to the invention, the unopened position walls on the container body and on closure part adjoin the separation line and delimit an annular space. One end of the annular space opens into the environment. The other end of the annular space opens into the separation line. In this way, a kind of undercut is achieved in the container material in the sense of a depression or recess impeding the demolding of the plastic molded part from a production mold, or actually rending impossible, because it extends transverse to the demolding direction. Surprisingly, in the present case, even with the above-mentioned preferred amorphous polymers, it is possible to perform a type of forced demolding without causing leaks of the container and, in particular, at the separation line. Moreover, for an average expert in this field, there is the surprising advantage that, after opening, there is a released container outlet without any sharp edges, which could constitute a risk of injury to the user. Also, no plastic threads form across the separation line.

Based on the solution according to the invention, even when the amorphous polyolefins or aromatic polyesters mentioned above are used as plastic production materials, a narrowly limited, very high stretching can be implemented in forming the undercut, which stretching contributes to the low opening torques desired. As such, the container or ampoule according to the invention can be opened using low actuating forces. Thus, with the solution according to the invention, opening torques can be achieved that are considerably lower than those for known containers made of the same material.

Because of the undercut mentioned, the closure part can structurally be formed as a three-dimensional hollow body having guide walls inclined towards the separation line to significantly facilitate the backflow of fluid from the hollow body in the head part of the container body in the direction of the container interior. In particular, an almost complete backflow is enabled without the aforementioned tapping movements being necessary.

In a preferred embodiment of the container according to the invention, conical walls on the container body and closure part are formed in the manner of truncated cones are placed inside each other, and delimit an annular space tapering in the direction of the separation line. Because of this design, the separation line is co-defined by the adjacent annular space and braced at the rim. The closure part then can be separated using low actuating forces from the container body for uncovering and dispensing of the container contents.

In a further advantageous manner, the conically extending annular space is oriented in the direction of the container body or in the direction of the closure part. Regardless of this orientation, the outlet area or the dispensing area of the container body is rimmed by conically extending boundary walls, which in any case ensure that any fluid present in the head part or closure part of the container body from the hollow body can flow back into the interior of the container body, and do so without the need for tapping that can result in the container contents foaming.

In another particularly preferred embodiment of the container according to the invention, the container body has a neck part that encompasses the releasable container outlet and that, in conjunction with the closure part, forms the separation line. Preferably, the separation line is formed by a weakened wall part area between the neck part and the closure part. The cap-shaped closure part can be twisted off the neck part along the separation line by a handle, forming a twist-off closure. A directed delivery of the fluid from the container body is achieved by creating a neck part that is regularly reduced in diameter relative to the container body. In this embodiment, it is also possible, within the scope of the design of the closure part, to achieve an enlarged twist-off tab as the handle by enlarging the closure part. This handle contributes to reducing the actuating forces when the closure part is twisted off the container body via its neck part.

In a further particularly preferred embodiment of the container according to the invention, the neck part projects beyond the releasable container outlet in the direction of the closure part in the unopened position, while forming an outlet plane. Also, the container outlet, which is uncovered in the open position, runs or extends along the separation line in a separation plane. The separation plane is arranged set back relative to the outlet plane in the direction of the container body. Even if the fracture surface, resulting from opening at the separation line, is rough or sharp-edged, depending on the choice of material, this opening does not constitute a disadvantage for the use of the container, due to the separation plane being offset from the outlet plane. For instance when the ampoule contents are applied directly to the skin or when such ampoules are taken into the mouth, the separation plane does not come into direct contact with the skin, but rather the outlet plane comes in direct contact, which outlet plane forms a smooth and preferably rounded contact surface.

However, embodiments of containers in which the outlet plane and the separating plane coincide with each other are also feasible. In any case, it is advantageous that the released rim of the neck part is bent inwards in the open position and limits the container opening in such a way as to enable an ergonomically advantageous application of the container contents at the user.

It has proved particularly advantageous to design the container as a drinking ampoule, preferably as a container for oxygen-sensitive tonics. The preferred container material is a plastic containing polyethylene terephthalate (PET), or poly(ethylene 2,5-furanedicarboxylate), (PEF) or glycol-modified polyethylene terephthalate (PETG), because these transparent materials have much higher oxygen barriers than polyethylene (PE) or polypropylene (PP). Advantageously, PET and in particular PEF are used when the tonics contain volatile flavors such as limonene. PEF has a higher barrier effect and lower sensitivity to stress cracking compared to PET.

Moreover, it has proved particularly advantageous to use the container for drugs and medical devices to be administered parenterally, preferably using amorphous polyolefin containing cycloolefin polymers (COP) or copolymers (COC). These transparent materials are characterized by low absorption tendency of preservatives, such as benzalkonium chloride, meta cresol, or phenol, typically used in parenteral products.

The invention also relates to a device for producing a container mentioned above, which is characterized in that at least two mold halves movable relative to each other are provided. The mold halves create the conically extending annular space, and whose mold parts are forcibly demolded from the annular space for the purpose of releasing the container from the mold.

The invention further relates to a method for producing a container using the above-mentioned device, wherein a blow molding, filling and sealing process (Bottelpack®) is used. This method can be modified by omitting the actual blow molding process and producing the container contour exclusively by applying negative pressure to the manufacturing mold. As a result of this modification, only a pressure difference of at most one bar is available for molding the container, which has, however, also proved to be sufficient according to the invention for the amorphous polymers mentioned above. This sufficiency is surprising even for an average expert in this field, because containers made of PET, PEF or PETG are manufactured applying much higher blowing pressures.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure are in general view and are not to scale.

DETAILED DESCRIPTION OF THE INVENTION

Figure 1:
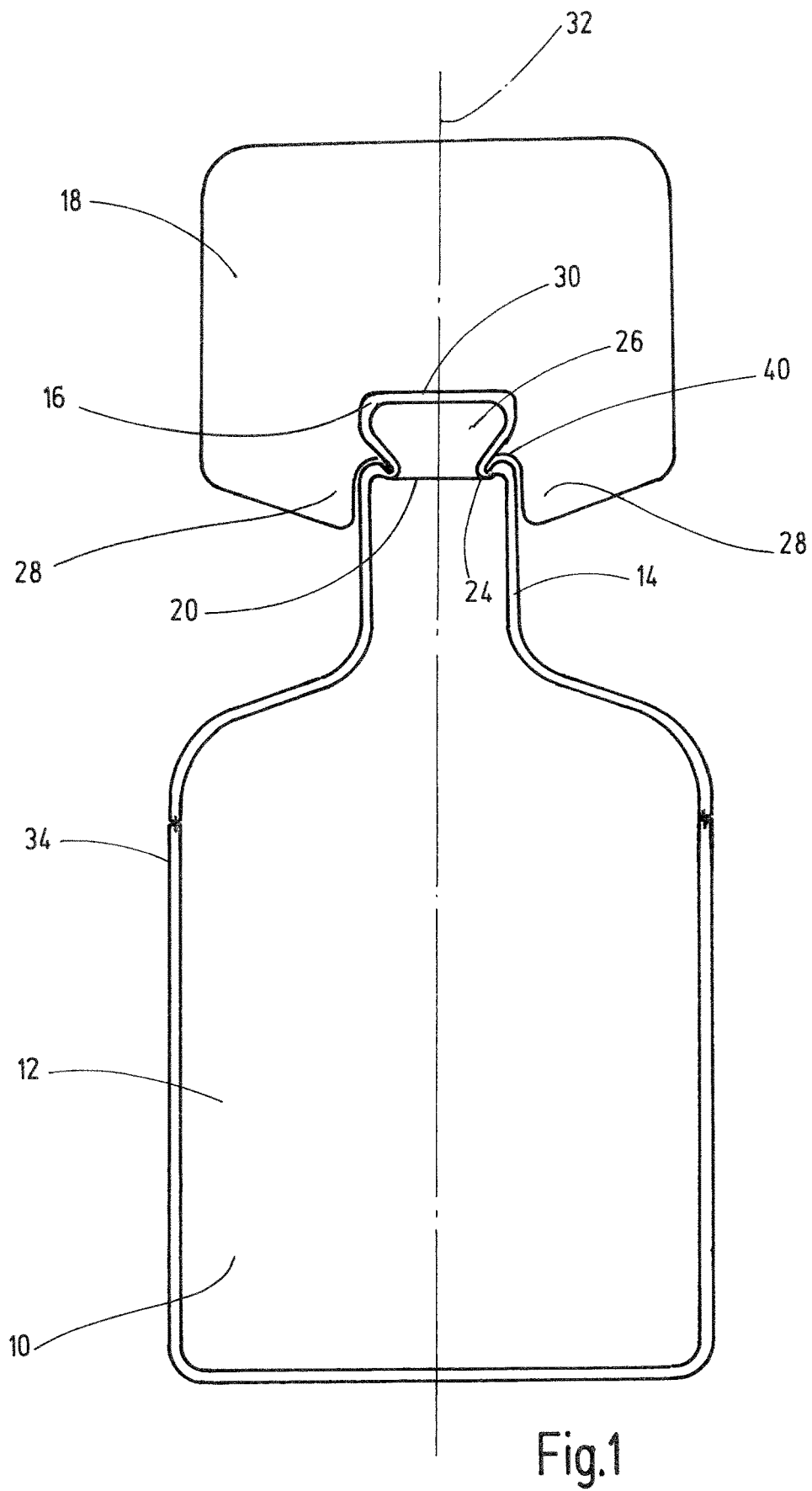
FIG. 1 is a top plan view of a container according to a first exemplary embodiment of the invention.

The container according to the exemplary embodiment of the invention shown in FIG. 1 is formed in particular in the form of a filled, hermetically sealed ampoule, which is formed in one piece before it is opened. The container shown has a hollow container or receiving body 10 for receiving a medium to be dispensed or a filling 12 (not shown in greater detail), amongst others in the form of liquids, suspensions, gels for medical purposes, cosmetic purposes or as a dietary supplement/tonic. The contents of the ampoule can be applied in particular orally or to the skin. Also, the contents of the container or ampoule may be a drug or medical device for inhalation therapy of the respiratory tract, particularly asthma or COPD. Furthermore, the contents of the ampoule may be used for ophthalmological purposes.

The ampoule-shaped container has the hollow-cylindrical container body 10 for receiving the respective filling product 12. The container body 10, seen upwards in the viewing direction of FIG. 1, merges into a cylindrical neck part 14 adjoined by a closure part 18 forming a head part 16. The closure part 18 is detachably connected to the neck part 14 via a circumferential separation line 20 used as a predetermined breaking point with the container body 10 in the area of a container opening 22 (FIG. 3) that can be released. At the separation line 20, the container has a reduced wall thickness. The separation line 20 is formed such that the closure part 18 can be twisted off the neck part 14 in the manner of a handle in the form of a twist-off closure from the container body 10 to release the container opening 22 (FIG. 3) for a withdrawal process of filling product 12 from the container interior in this way.

The head section 16 of the closure part 18 has a hollow chamber 26, which is connected to the interior of the container body 10 in a media- or fluid-conveying manner. Seen in the viewing direction of FIG. 1, two flag-shaped projections 28 of the flat closure part 18 protrude edge-sided downward beyond the neck part 14 and in that way protect the separation line 20. In other respects, the closure part 18 encompasses the hollow chamber 26, which is bowl-shaped and has, at its upper free end face, a substantially planar end wall 30, which is formed circular-shaped and is arranged to extend transverse to the longitudinal axis 32 of the container.

The container shown in FIG. 1 can be produced using a standard blow molding, filling and sealing process (BFS process), which has also become known to experts as the trademark Bottelpack®. The container or ampoule has a volume of less than 50 ml, preferably less than 30 ml, particularly preferably less than 20 ml. In the embodiment shown, the ampoule is formed to be not resealable after its opening and is otherwise conceived as a one-piece container prior to the removal of the closure part 18. The wall 34 of the container can be formed having a single layer, but also having multiple layers, in particular having two layers.

Suitable materials for producing the container are the polyolefins commonly used for the BFS process, such as low-density polyethylene (LDPE; for instance, Purell 3020 D by the company LyondellBasell), higher-density polyethylene (HDPE, for instance, Purell PE GF 4760 by the company LyondellBasell), and polypropylene (PP, for instance, Purell RP 270G by the company LyondellBasell).

However, amorphous polymers, in particular aromatic polyesters such as PEN (polyethylene naphthylate), PBT (polybutene terephthalate), preferably PET (polyethylene terephthalate) or its copolyesters such as PETG, particularly preferably PEF (poly(ethylene 2,5-furanedicarboxylate)) and PEF-copolymers plus blends containing PEF, are used particularly advantageously for the container according to the invention.

Amorphous polyolefins, in particular cycloolefin-containing polymers such as for instance cycloolefin polymers COP (Zeonex by the company Zeon, Japan) or cycloolefin copolymers COC (Topas by the company Topas, Frankfurt) and their blends with other polyolefins, in particular LLDPE (linear low-density polyethylene), can be used in the same way.

It is only based on the use of the shape of the ampoule according to the invention that products can be made from the aforementioned amorphous polymers. With those products, the user can open the container effortlessly and without creating sharp edges. Compared to ampoules of the state of the art, the container solution according to the invention significantly reduces the average opening torque, which will be explained in more detail below.

It has also proved to be advantageous to manufacture the ampoule from a material containing a cycloolefin polymer and/or a cycloolefin copolymer having a glass transition temperature of less than 150° C., preferably less than 100° C., and/or blends thereof.

Figure 2A:
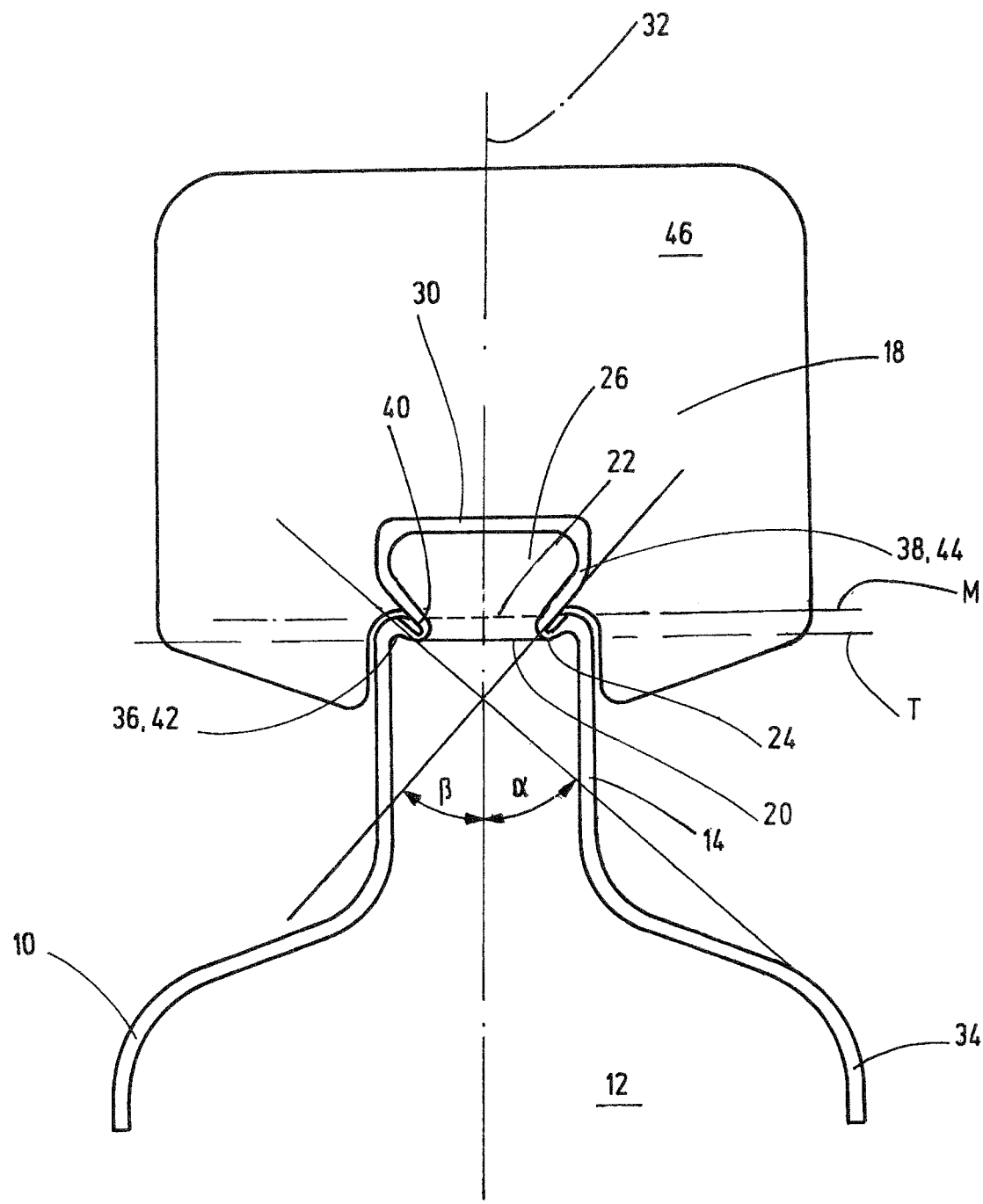
FIG. 2a is an enlarged, partial top plan view of an upper container section before separation of a closure part of the container of FIG. 1.

In particular, as shown in the enlarged view of FIG. 2a, in the unopened position of the container, two conically extending walls 36, 38 adjoin the separation line 20. The wall 36 extends from the neck part 14, and the wall 38 extends from the closure part 18. Starting from the separation line these delimit an annular space 40, one free end of which opens out into the environment. The outlet into the environment is optionally interrupted on two opposite sides by the two extending protrusions 28 of the closure part 18. The conical walls 36 and 38 of the neck part 14 and of the closure part 18, respectively, each have the shape of closed annular bodies and, in particular, in the manner of truncated cones 42 and 44, respectively, which, placed inside each other, delimit the annular space 40, which tapers in the direction of the separation line 20 in the manner of a half-arch. Thus, the conical wall 36 forms the one annular truncated cone 42, and the conical wall 38 forms the other annular truncated cone 44, which is placed inside the outer truncated cone 42, as shown in the drawing, until it reaches the separation line 20.

Figure 3:
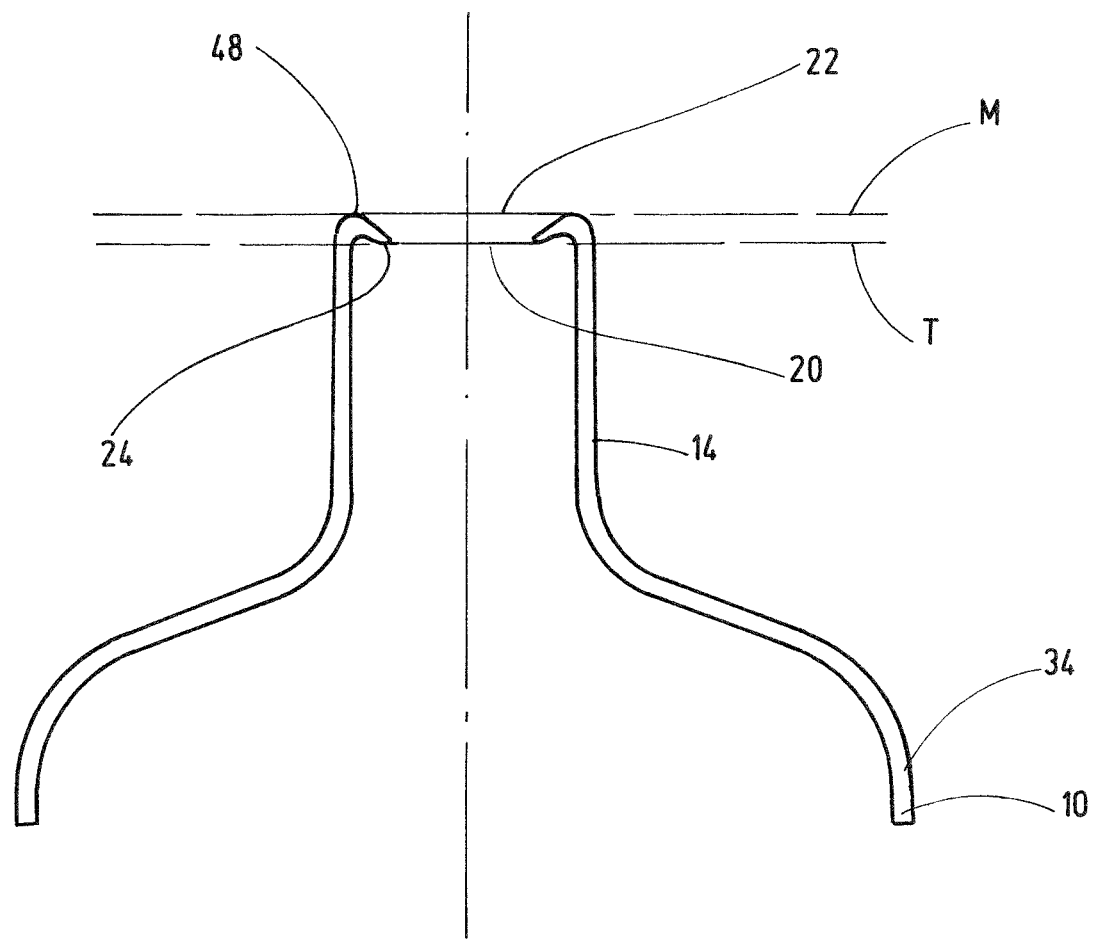
FIG. 3 is an enlarged, partial top plan view of an upper container section after separation of the closure part of the container of FIG. 1.
Figure 4:
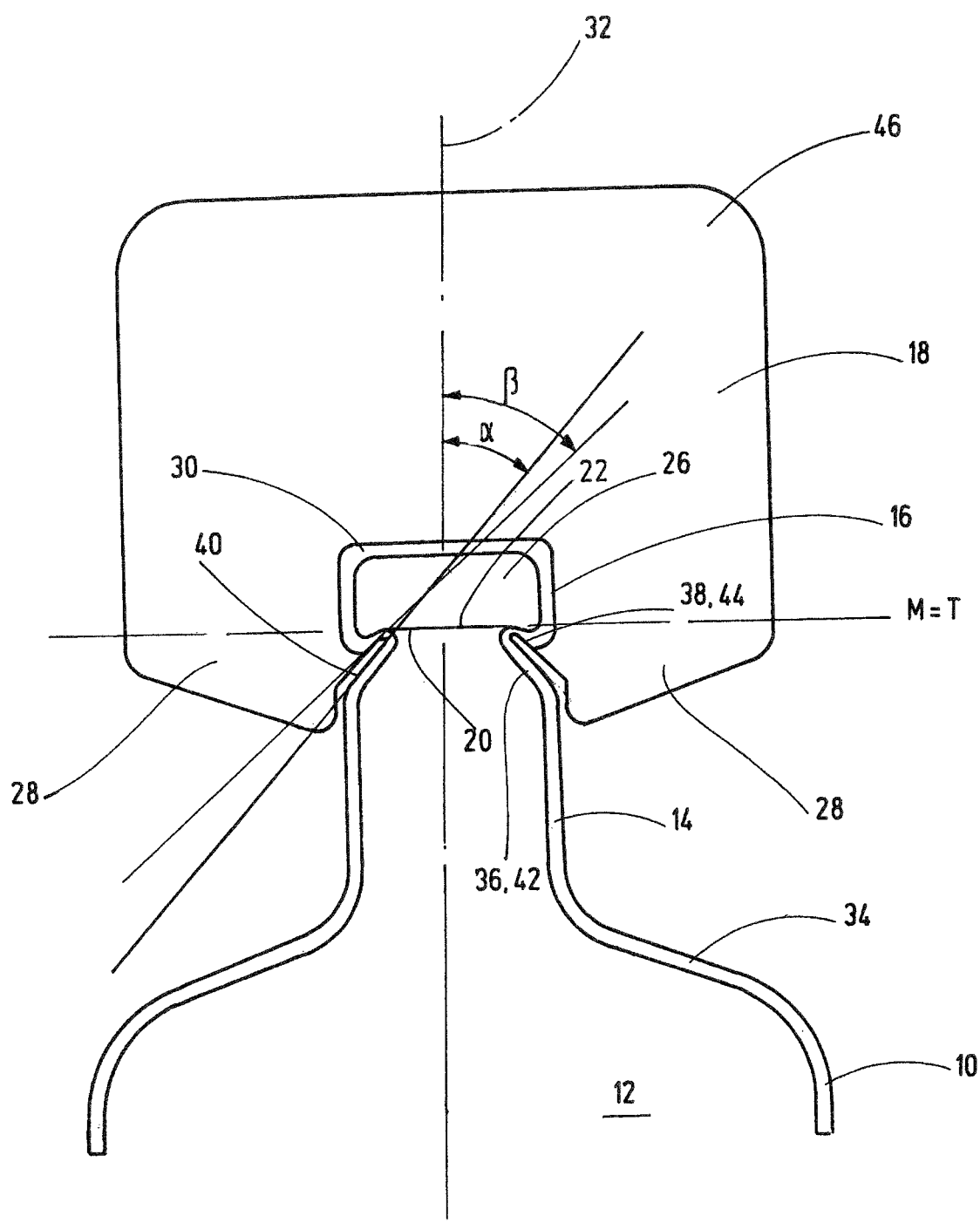
FIG. 4 is an enlarged top plan of an upper section of a container according to a third exemplary embodiment of the invention with and without a closure part.

As shown in FIGS. 1 and 2a, the tapered annular space 40 can be oriented toward the container body 10 or, as shown in FIG. 4, toward the closure part 18. In particular, the mentioned figures show that in fictious or imaginary dislocation of the walls 36 and 38, respectively. The longitudinal axis 32 of the container forms an angle of $\alpha$ and $\beta$ with walls 36 and 38, respectively. The angles $\alpha$ and $\beta$ can differ from each other. In FIG. 2, the angle is a approx. 50°, and the angle $\beta$ is 40°. Depending on the design of the solution, the undercut angles $\alpha$ and $\beta$ formed in this way can have values between 25° and 60°, preferably between 30° and and particularly preferably between 40° and 50°, as shown for the exemplary embodiments. The undercut in the form of the annular space does not have to completely encompass the separation line 20. It is sufficient if the separation line 20 is partially enclosed by the annular space 40. If the cap-shaped closure part 18 is separated from the neck part 14 along the separation line 20 by a handle 46, the embodiment according to FIGS. 1 and 2 results in an opened container according to the embodiment according to FIG. 3. FIG. 3 shows that the neck part 14, while forming a frontal outlet plane M along the uncovered container opening 22, and projects opening 22 in the direction of the now separated closure part 18, and shows that the separation line 20, which is released in the open position, runs in a separation plane T. This separation plane T is set back in the direction of the container body 10 relative to the outlet plane M. Both the outlet plane M and the separating plane T are fictitious or imaginary planes as they appear when extending through the released container opening 22 and along the annular separation line 20, respectively.

As also further illustrated in FIG. 3, the released rim in the form of the plastic wall part 24 is bent inwards in the open position of the container and delimits the free container opening cross-section in the region of the projecting bulge. Regardless of what the breaking point at the released rim of the wall section 24 looks like, a smooth abutment rim 48 is formed along the outlet plane M in any case, ensuring that an application can be performed without any risk of injury.

In the exemplary embodiments of the container shown in the Figures, the depicted cross-sections to be released of the container are mainly circular. However, it is also possible to form the separation line 20 and ultimately also the undercut in the form of the annular space 40 not circular, but in a preferred manner also oval or elliptical (not shown). In any case, however, care should be taken to ensure that the opening cross-sectional area of the container opening 22, which is released when the closure part 18 is separated from the rest of the ampoule or container body 10, is smaller than 80 mm$^2$, preferably less than 25 mm$^2$, more preferably less than 15 mm$^2$.

In the exemplary embodiment according to FIGS. 1, 2a and 3, the conical circumferential wall 38 in the closure part 18 forms a circumferential inclined guide to permit any product 12 present in the hollow chamber 26 to flow back on its own in a vertical direction when the container is closed and upright. For this purpose, in the described solution, the first truncated cone 44 is arranged above the separation line 20 in the separation plane T. In this case, the truncated cone 44 adjoins in an arcuate transition region the end wall 30, shown horizontally in the figures, of the bowl-shaped hollow chamber 26. As can be seen further from FIGS. 1, 2a and 3, a further arcuate redirection occurs at the wall part weakening in the area of the separation line 20, starting from the truncated cone 44 to the further truncated cone 42, which adjoins the neck part 14 at the top. The truncated cone 44 transitions into the circular cylindrical connecting piece of the neck part 14 via the arcuate abutment rim 48.

Figure 2B:
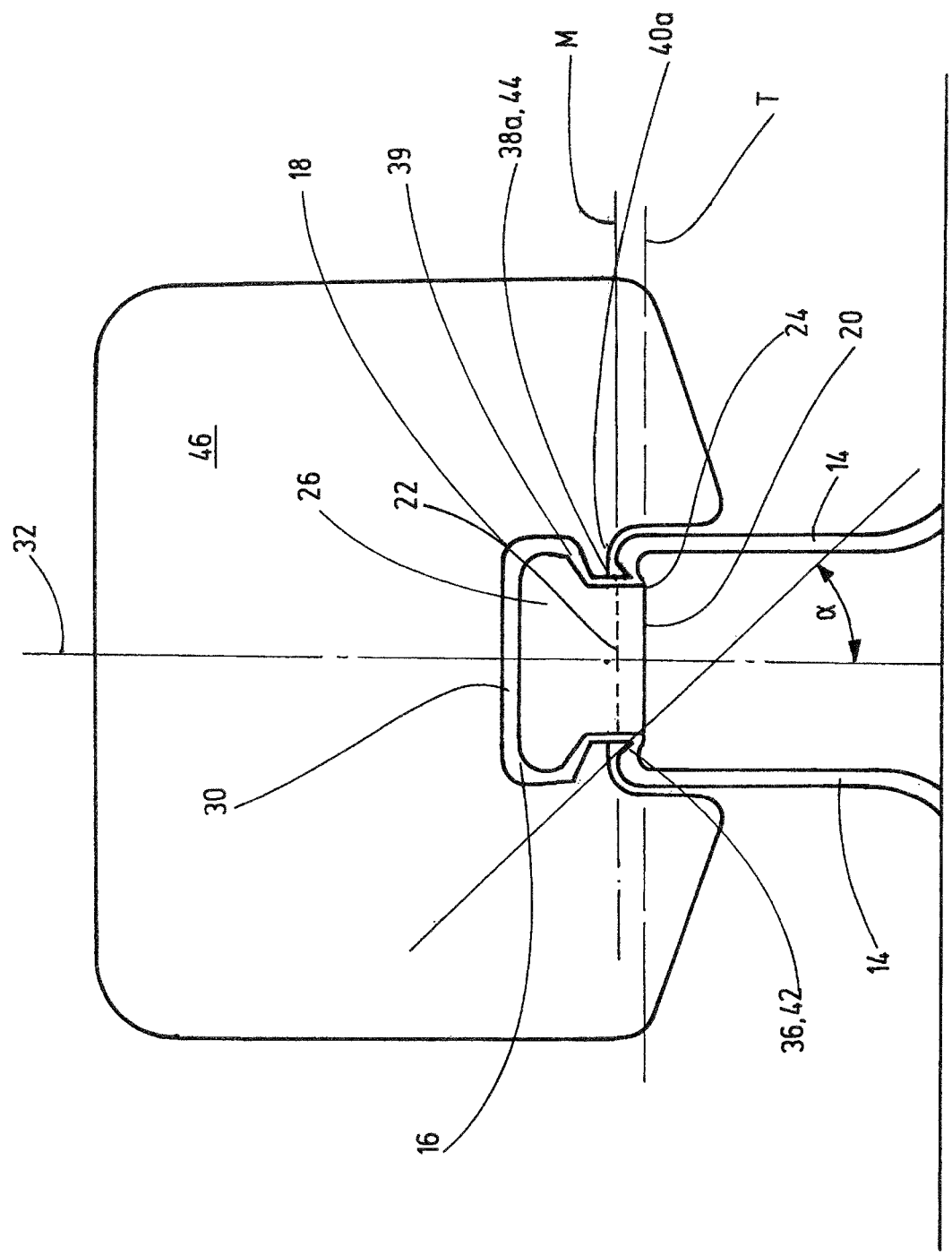
FIG. 2b is an enlarged, partial top plan view of an upper container section of a container according to a second exemplary embodiment of the invention, before a closure part is severed.

The exemplary embodiment shown in FIG. 2b is similar to FIG. 2a, but has a step-shaped annular space 40a delimited by the separation line 20. The annular space 40a is formed on the one hand by the conical wall 36 of the container neck 14, wherein the fictitious or imaginary extension of the conical wall 36 is at an undercut angle $\alpha$ of approx. 45° to the longitudinal axis 32, and on the other hand by the cylindrical partial wall 38a, oriented in parallel to the longitudinal axis 32, and the partial wall 39, adjoining the cylindrical partial wall 38a at an angle, of the head part 16.

Figure 5:
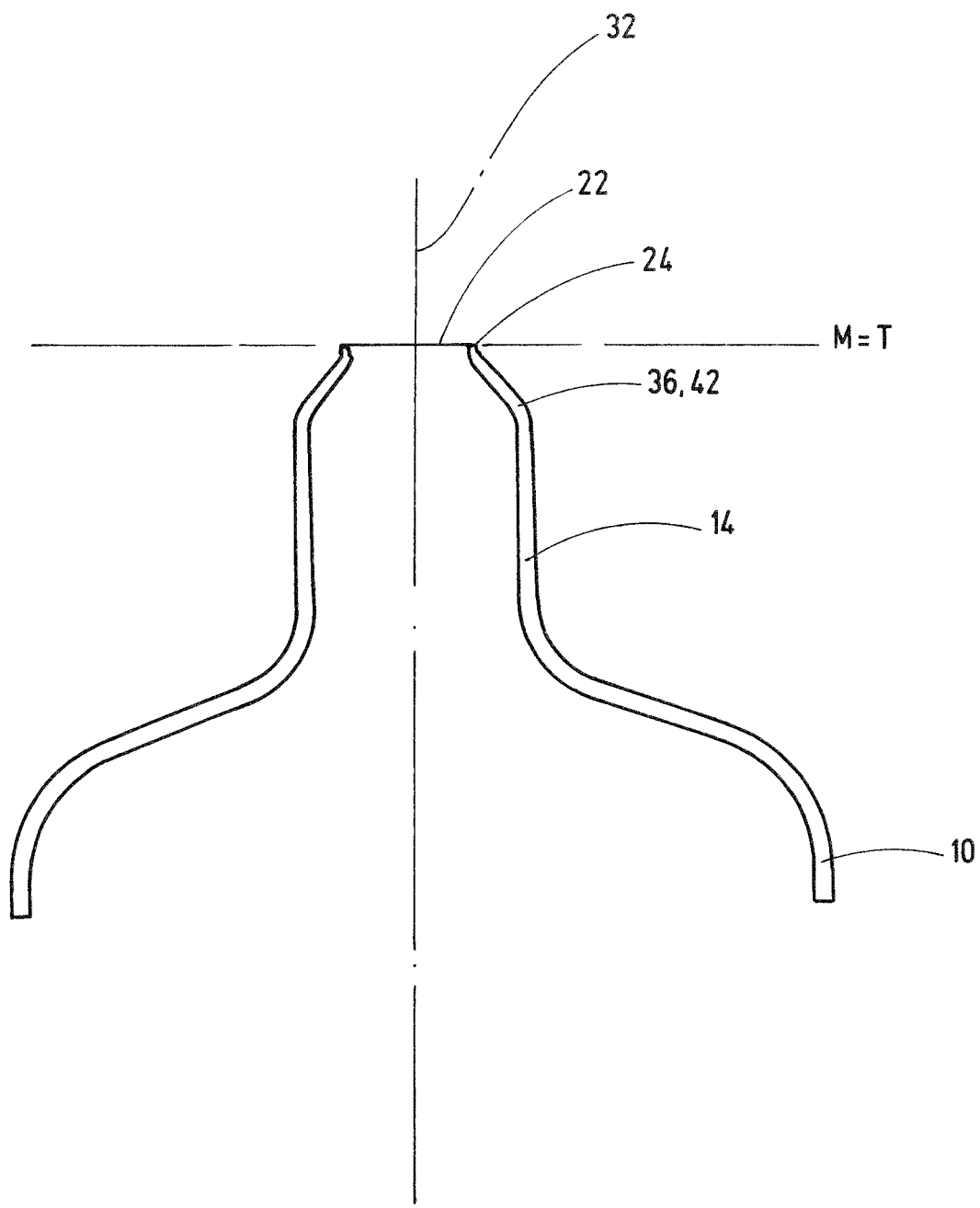
FIG. 5 is an enlarged, partial top plan view of an upper container section after separation of the closure part of the container of FIG. 4.

The modified embodiment shown in FIGS. 4 and 5 will be explained to the extent that it differs substantially from the preceding embodiment. Thus, FIG. 4 illustrates that the conical inclination of the annular space 40 delimited by the truncated cones 42, 44, is now oriented in the direction of the closure part 18, whereas in the embodiment mentioned first, the conical orientation of the annular space 40 points in the direction of the container body 10. This modified embodiment results, among other things, in the outlet plane M equals the separation plane T, as the illustration of FIG. 5 shows, when the closure part is separated along the separation line 20. In this respect, also both truncated cones 42, 44 having their conical orientation and the undercut angles $\alpha$ and $\beta$ formed are oriented towards the closure part 18. In this embodiment, the angle $\beta$ is always greater than or equal to angle $\alpha$.

As FIG. 4 further shows, the bowl-shaped hollow chamber 26, now having straight boundary walls extending in a cylindrical shape, is adjacent to the truncated cone 44 and only below the separation line 20, as viewed in the direction of FIG. 4. The further truncated cone 42 of the container body 10 is provided, which supports a backflow of fluid from the hollow chamber 26 towards the interior of the container, even when the container is open.

In both exemplary embodiments, it is achieved that for the production of the respective undercut or the conical annular space 40, there is a longer stretching length of the material of the container with local thinning at the predetermined breaking point in the form of the separation line 20. Separation line 20 supports a concentrated application of force, such that the respective container can be opened with little breaking work, i.e. with low torques at the handle 46. This arrangement is without equivalent in the prior art.

Figure 6:
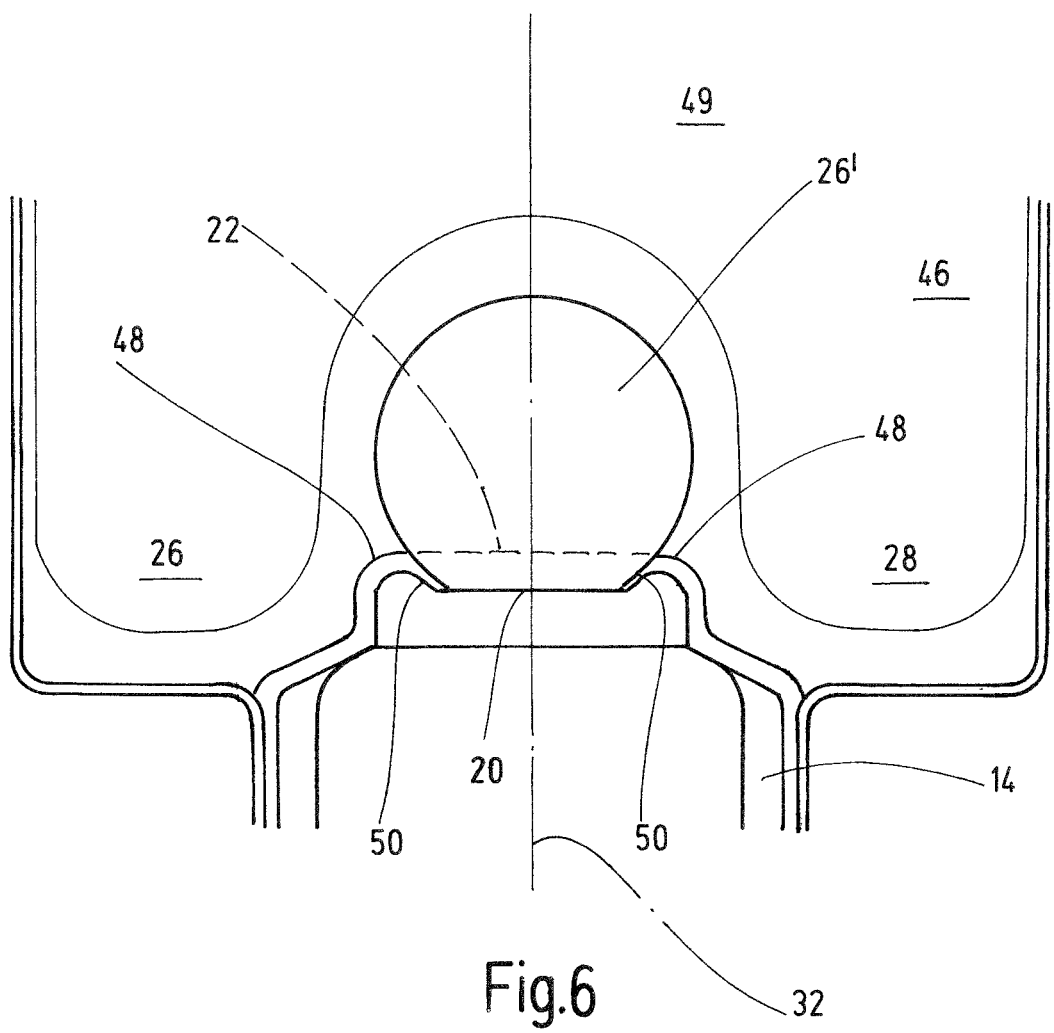
FIG. 6 shows a part of a molding device for producing a head part of a container according to FIGS. 1 and 2a according to an exemplary embodiment of the invention.

In FIG. 6, one half of a manufacturing mold is disclosed, which can be used to manufacture the undercut according to FIGS. 1 and 2 with the proviso that a spherical hollow body 26' is implemented as the closure part instead of the bowl-shaped flat hollow body 26. The conical undercut or annular space 40 is created by a protruding web-shaped molding burr which is inclined projecting toward the longitudinal axis 32 and is part of an inclined, closed molding ring surface. The container body as a whole together with head part 16 and the handle 46 is then to be removed from the molding device. The molding device is divided into two parts and the matching second head mold can be placed, perpendicular to the drawing plane of FIG. 6, on the one head mold shown for a molding process and removed for a demolding process. For the sake of simplicity, the reference numerals drawn in FIG. 6 stand for the plastic parts to be manufactured of the container product according to FIGS. 1 to 3, which are not components of the production mold.

The manufacturing mold, partially shown in FIG. 6, for a container as shown in FIGS. 1 to 3 can also be used with the aforementioned amorphous thermoplastic materials for a blow molding, filling and sealing process. The peculiarity in this case is that the container shown can also be created without an actual blow molding process, by applying negative pressure to the inside of the molding device.

For a further explanation, further exemplary embodiments (test numbers 1-18) are specified below.

Ampoules having different opening cross-sectional areas without undercut, as they are common in the state of the art, and ones with undercut or conical annular space 40 according to the invention and to FIGS. 1 and 2a having different undercut angles α and β have been produced from 8 different materials. Angle β was always approx. 10°-15° smaller than angle α. For this purpose, a BFS system by the company Rommelag of the type Bottelpack bp312M having quadruple molds was used; thereby the polymers listed below were used: PEF, PET, PET copolyester, PETG and a further copolyester (S2008, company SK Chemicals). Furthermore, COP and COC polymers. The opening torques of the ampoules were measured using the torque meter Vortex-i by the company Mecmesin at a rotational speed of 10 rpm. Details of polymer preparation, extrusion conditions and ampoule production and the results—the ratio of opening torques with and without undercut for the same opening cross-sectional area—are shown in the table below. The results (average values from 4 ampoules each) of the solution according to the invention show a significant reduction of the opening torques of 88% (test no. 1) up to 69% (test no. 18) in each case compared to the otherwise identically formed reference ampoule having the same opening area.

While various embodiments have been chosen to illustrate the invention, it will be understood by those skilled in the art that various changes and modifications can be made therein without departing from the scope of the invention as defined in the claims.

The invention claimed is:

1. A container made entirely or predominantly of one or more plastic materials, the container comprising:
   a container body capable of receiving a filling product that may be removed via a releasable container opening;
   a closure part detachably connected to a neck part of the container body along a separation line in an unopened position of the container; and
   in the unopened position, a conically extending first wall on the neck part on the container body and a conically extending second wall on the closure part adjoining the separation line, the first and second walls delimiting at least a part of an annular space, one end of annular space opening out into an environment surrounding the container and another end of the annular space opening out into the separation line, the first wall on the neck part and the second wall on the closure part being formed as truncated cones, being placed one inside the other, and delimiting the annular space;
   whereby the container opening is opened after the closure part is separated from the container body along the separation line.

2. The container according to claim 1 wherein the annular space is oriented toward the container body.

3. The container according to claim 1 wherein the annular space is oriented toward the closure part.

4. The container according to claim 1 wherein the first and second walls delimiting the annular space extend at angles relative to a longitudinal axis at angles of 25° to 60°.

5. The container according to claim 1 wherein the first and second walls delimiting the annular space extend at angles relative to a longitudinal axis at angles of 30° to 50°.

6. The container according to claim 1 wherein the first and second walls delimiting the annular space extend at angles relative to a longitudinal axis at angles of 40° to 50°.

| Versuchs Nr | Fläche Öffnung mm$^2$ | Ampulle gemäß FIG. | Winkel Alpha grad | Polymer Klasse | Polymer Type | Polymer Hersteller | Trocknung | Masse Druck bar | Masse- Temperatur ° C. | Öffnungsdrehmoment Ampulle/ Referenzampulle |
|---|---|---|---|---|---|---|---|---|---|---|
| 1 | 12 | 2 | 45 | PET-Copolyester | MX810 | Eastman | 6 h bel 87° C. | 260 | 205 | 88% |
| 2 | 12 | 2 | 55 | PETG | MB002 | Eastman | 12 h bel 60° C. | 240 | 210 | 87% |
| 3 | 12 | 3 | 55 | PBT | Pocan B1501 | Lanxess | 6 h bel 125° C. | 250 | 260 | 85% |
| 4 | 12 | 3 | 45 | PETG | S2008 | SK Chemicals | 6 h bel 55° C. | 220 | 200 | 83% |
| 5 | 12 | 3 | 50 | PETG | S2008 | SK Chemicals | 6 h bel 55° C. | 220 | 190 | 83% |
| 6 | 20 | 2 | 50 | PET | Traytuf 9506 | M&G Chemicals | 10 h bel 120° C. | 260 | 250 | 82% |
| 7 | 12 | 2 | 45 | PET-Copolester | Polyclear 5505 | Invista | 10 h bel 120° C. | 280 | 251 | 79% |
| 8 | 12 | 2 | 40 | PET | Traytuf 9506 | M&G Chemicals | 10 h bel 120° C. | 260 | 250 | 78% |
| 9 | 12 | 2 | 40 | PETG | MB002 | Eastman | 12 h bel 60° C. | 240 | 210 | 77% |
| 10 | 12 | 2 | 45 | PETG | MB002 | Eastman | 12 h bel 60° C. | 240 | 210 | 77% |
| 11 | 12 | 3 | 45 | PET | Traytuf 9506 | M&G Chemicals | 10 h bel 120° C. | 260 | 250 | 75% |
| 12 | 12 | 2 | 40 | PEF | PEF | Avantium | 18 h bel 150° C. | 255 | 255 | 73% |
| 13 | 7 | 2 | 45 | COC | Topas 8007S | Topas | 6 h bel 50° C. | | | 72% |
| 14 | 7 | 2 | 45 | COP | Zeonex 5000 | Zeon | 6 h bel 50° C. | | | 72% |
| 15 | 20 | 2 | 40 | PEF | PEF | Avantium | 18 h bel 150° C. | 255 | 255 | 71% |
| 16 | 12 | 2 | 45 | PET | Traytuf 9506 | M&G Chemicals | 10 h bel 120° C. | 260 | 250 | 70% |
| 17 | 12 | 3 | 35 | PET | Traytuf 9506 | M&G Chemicals | 10 h bel 120° C. | 260 | 250 | 70% |
| 18 | 25 | 2 | 45 | PEF | PEF | Avantium | 18 h bel 150° C. | 255 | 255 | 69% |

7. The container according to claim 1 wherein
the neck part encompasses the releasable container opening and together with the closure part forms the separation line.

8. The container according to claim 1 wherein
the separation line comprises a weakened wall subarea between the neck part and the closure part; and
the closure part is removable from the neck part along the separation line by a handle on the closure part.

9. The container according to claim 1 wherein
the container opening is located in an opening plane spaced in a direction of the closure part with respect to a separation plane in which the separation line is located.

10. The container according to claim 1 wherein
a released rim of the neck part is bent inwards into the neck part in the open position.

11. The container according to claim 1 wherein
the plastic materials comprise an amorphous polyolefin.

12. The container according to claim 1 wherein
the plastic materials comprise a cycloolefin polymer and/or a cycloolefin copolymer having a glass transition temperature of less than 150° C., preferably of less than 110° C., and/or blends thereof.

13. The container according to claim 12 wherein
the glass transition temperature of less than 110° C.

14. The container according to claim 1 wherein
the container is a drinking ampoule; and
the plastic materials comprise an aromatic polyester.

15. The container according to claim 14 wherein
the aromatic polyester is polyethylene terephthalate (PET).

16. The container according to claim 14 wherein
the aromatic polyester is polyethylene furanoate (PEF).

17. The container according to claim 1 wherein
the septation line is spaced from an end of the neck part in a direction of the container body; and
a released rim of the neck part is bent inwards into the neck part in the open position forming a smooth curve surface at an exposed end of the neck part.

* * * * *